United States Patent
Batistic

(10) Patent No.: US 6,246,947 B1
(45) Date of Patent: Jun. 12, 2001

(54) METHOD OF IMPROVING ABS CONTROL BEHAVIOR

(75) Inventor: Ivica Batistic, Frankfurt am Main (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/214,950
(22) PCT Filed: Apr. 25, 1997
(86) PCT No.: PCT/EP97/02136
 § 371 Date: Sep. 1, 1999
 § 102(e) Date: Sep. 1, 1999
(87) PCT Pub. No.: WO98/03384
 PCT Pub. Date: Jan. 29, 1998

(30) Foreign Application Priority Data

Jul. 18, 1996 (DE) ............................................. 196 28 981

(51) Int. Cl.⁷ ............................... G06F 7/00; G06F 17/00
(52) U.S. Cl. ................... 701/72; 701/70; 701/83; 701/91; 303/186; 303/189; 303/901
(58) Field of Search .................. 701/70, 71, 72, 701/74, 78, 83, 89, 91; 180/197; 340/444; 303/163, 165, 186, 189, 901

(56) References Cited

U.S. PATENT DOCUMENTS

| | | | |
|---|---|---|---|
| 5,140,524 | * 8/1992 | Matsuda | 701/72 |
| 5,270,933 | * 12/1993 | Fennel et al. | 701/74 |
| 5,669,679 | * 9/1997 | Hammoud et al. | 303/165 |
| 5,691,900 | * 11/1997 | Luckevich et al. | 701/41 |
| 5,694,321 | * 12/1997 | Eckert et al. | 701/91 |
| 5,774,821 | * 6/1998 | Eckert et al. | 701/78 |
| 5,863,105 | * 1/1999 | Sano | 303/146 |
| 6,012,010 | * 1/2000 | Batistic et al. | 701/72 |

FOREIGN PATENT DOCUMENTS

| | | |
|---|---|---|
| 462 635 | 12/1991 | (EP) . |
| 522 615 | 1/1993 | (EP) . |

* cited by examiner

*Primary Examiner*—William A. Cuchlinski, Jr.
*Assistant Examiner*—Gertrude Arthur
(74) *Attorney, Agent, or Firm*—Rader, Fishman & Grauer PLLC

(57) ABSTRACT

To improve the steerability and the driving stability of a vehicle during cornering, the standard control mode is replaced by a special or curve control mode in such a situation in an anti-lock system. This special control mode reduces the brake pressure on the wheel at the inner side of the curve.

When, during a braking operation and with the special control mode activated, there is a transition from cornering to straight travel, the pressure deficit on the wheel at the inner side of the curve which is caused by the special control mode is compensated by a special pressure increase mode, for example, by compressing the pressure increase pulse row.

2 Claims, 1 Drawing Sheet

METHOD OF IMPROVING ABS CONTROL BEHAVIOR

BACKGROUND OF THE INVENTION

The present invention relates to a method of improving the control behavior of an anti-lock control system, in particular, of improving the steerability of the automotive vehicle and the driving stability during cornering, wherein a vehicle reference speed is derived from the rotating behavior of the vehicle wheel s and criteria are obtained for identifying a cornering situation and the curve direction, and once a cornering situation is identified, the standard control mode is replaced by a special or curve control mode which already in the partial deceleration range causes a reduction in brake pressure on the front wheel at the inner side of the curve and/or on the rear wheel at the inner side of the curve.

During cornering is identified, a stabilizing yaw moment about the vertical axis of the vehicle that compensates for cornering is produced in a control method of the above-mentioned type by relieving the wheels at the inner side of the curve from pressure. The brake pressure on the wheels at the outer side of the curve is maintained constant when the control commences during a partial braking operation, or increases automatically by interrupting further brake pressure increase on the wheel(s) at the inner side of the curve.

DE 34 13 738 C2 discloses an anti-lock control system provided with a system for identifying a cornering situation also based on wheel slip measurement. To identify a cornering situation, the slip values on the wheels at one vehicle side are summed up and compared to the slip values on the wheels at the other vehicle side, generating a cornering identification signal as soon as the difference of the summed-up slip values exceeds a predetermined threshold value. Upon identification of a cornering situation, selection criteria, such as "select-low" or "select high" according to which the course of pressure in the individual brake pressure control channels of the said brake system is controlled, and threshold values for rendering the said selection criteria effective, are varied. In this way, the control will be adjusted to the varying conditions during straight-forward driving and during cornering.

DE 21 19 590 A1 teaches generating a cornering identification signal with the aid of a lateral accelerometer, such as a mercury switch.

Moreover, it is already known in the art to extend the functions of an anti-lock control system by employing the system for improving the driving stability or deceleration stability in a curve. For this purpose, during cornering or during a partial deceleration, i.e., in a deceleration process in which the threshold of response to the anti-lock control system is not achieved, a stabilizing moment about the vertical axis of the vehicle is created by specifically delaying the brake pressure build-up on the wheels at the inner side of the curve compared to the brake pressure on the wheels on the outer side of the curve ("Bremsanlage und Schlupf-Regelsystem der neuen 7-er Reihe von BMW" (Brake System and Slip Control System of the new BMW No. 7 series); ATZ 97 (1995), pp. 8–15, and "Bremsanlage und Schlupf-Regelsysteme der neuen Baureihe 5 von BMW" (Brake System and Slip Control Systems of the new BMW No. 5 series); ATZ 98 (1996), pp. 188–194. The information on the actual steering angle is derived—if no steering angle sensor is used—from the lateral acceleration which, in turn, is calculated from the wheel sensor signals.

It is an object of the present invention to ensure, in a method of the above-mentioned type, that a shortest possible stopping distance can be achieved in all cases, i.e., also in situations which might be affected by the special control mode. One objective is to avoid the occurrence of an extension of the necessary stopping distance as a result of the special control mode which, in terms of its principle, causes a reduction of the brake force on the wheels at the inner side of the curve.

SUMMARY OF THE INVENTION

It has been found that this object can be achieved by a method the special features of which include that during a braking operation and with the special control mode activated, in the transition from cornering to straight travel or with changing curve directions, the brake pressure on the front wheel at the inner side of a curve and/or the rear wheel at the inner side of a curve, or a pressure deficit caused by the special control mode is compensated by a special pressure increase mode.

In brake systems of the type mentioned hereinabove, the pressure variation in the wheel brakes is produced in control operations by pulsewise actuation of electrically operable hydraulic valves which are inserted into the pressure fluid conduits. In a favorable aspect of the present invention which is appropriate for brake systems of this type, the pressure increase pulse row which is predetermined in a standard pressure increase mode is compressed in the special pressure increase mode by shortening the pulse-pause times between the brake pressure metering pulses.

The very simple provision disclosed in the present invention reliably prevents the pressure deficit which is due to the special control from causing an undesirable extension of the stopping distance when the cornering situation is 'left' or in the event of a change of curve directions.

Further details, advantages and end-use applications of the present invention will become manifest from the following description of an embodiment with reference to the enclosed flow chart.

DETAILED DESCRIPTION OF THE DRAWING

Figure 1:
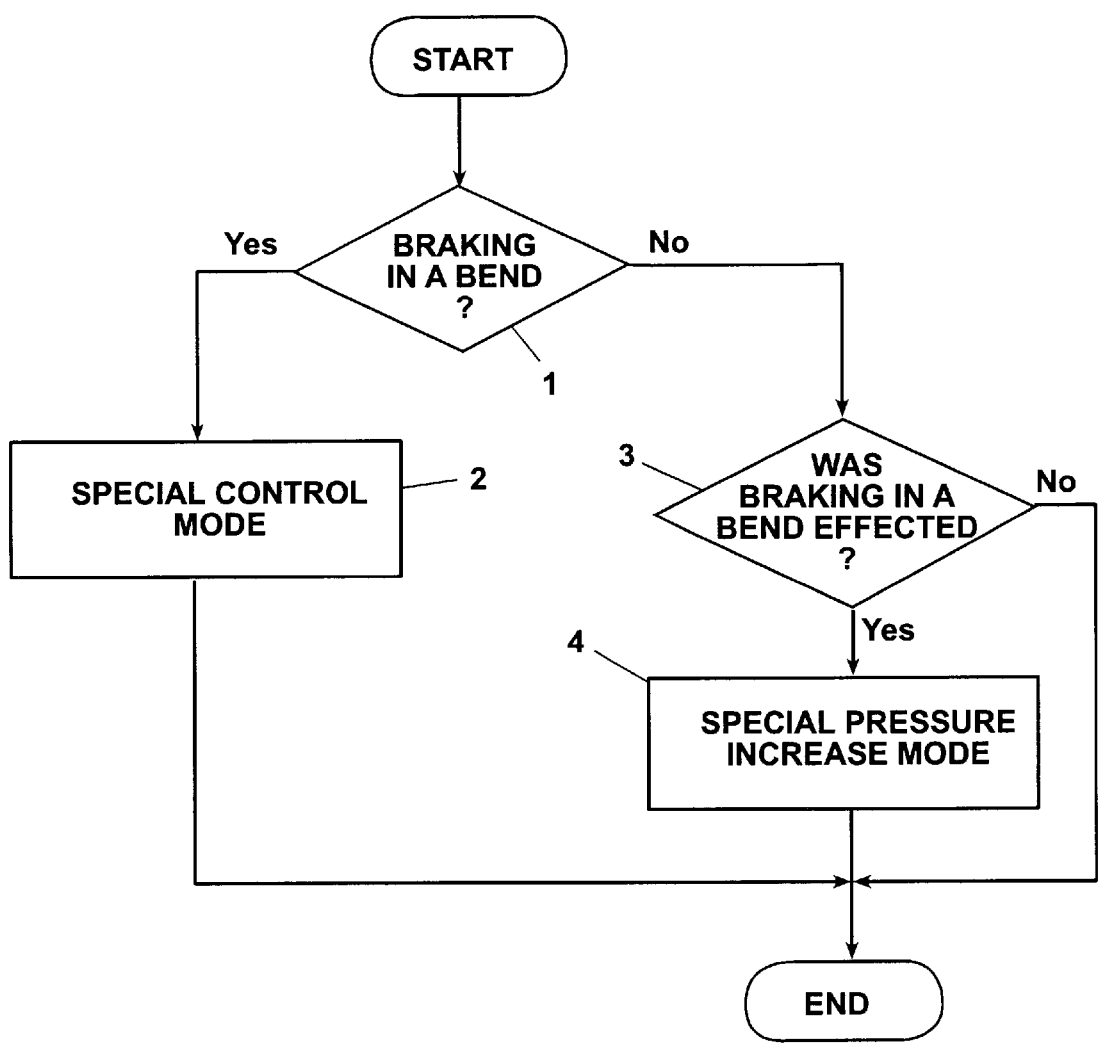
FIG. 1 is a flow chart showing a section of the control sequence or program run of an anti-lock system wherein the method of the present invention is implemented.

After the START of the (sub)program shown, it is determined in a first decision-making step, branch point 1, whether braking during cornering, i.e. a partial braking operation (meaning a braking operation without employing the ABS control), or an ABS braking operation during cornering of the vehicle exists at the moment. If this is the case (J), a special control mode which is also referred to as curve control mode, is started or continued, as represented by operation 2.

In the absence of braking during cornering at the point of time of the interrogation 1 (braking during cornering: no), it is detected in step 3 whether cornering identification existed immediately before this time. If 'yes', a special pressure increase mode is initiated according to the present invention, represented by function step 4. It is ensured by this special pressure increase mode that a possible pressure deficit at the 'underbraked' wheel at the inner side of the curve is compensated very quickly. The pressure build-up in the wheel brake of this wheel is effected with an increased pressure increase gradient in comparison with a standard pressure increase mode. In brake systems with pulsewise driven hydraulic valves, in particular inlet valves (a mode of operation or a design of this type is of common use in current anti-lock systems), the pressure increase pulse row is compressed by shortening the pulse-pause times in comparison with the standard pressure increase mode.

The Present Invention is Based on the Following Reflections

In order to increase driving stability and improve steerability of the vehicle, during braking while cornering in the special or curve control mode, the brake pressure on the front wheel and/or rear wheel at the inner side of the curve is maintained on a lower level or, respectively, ABS control is effected in conformity with remarkably more sensitive control activation thresholds compared to braking operations during straight travel.

Simultaneously, the brake pressure is increased on the wheels at the outer side of a curve, especially on the front wheel at the outer side of a curve, in a like cornering situation. During ABS control operations, the control activation thresholds are increased in this situation so that the control reacts less sensitive compared to straight travel.

If the direction of a curve changes or if the vehicle passes over to straight travel during a special or curve control mode, a pressure deficit will occur on the front wheel and/or rear wheel which was at the inner side of the curve up to this moment, and a pressure surplus will occur on the front wheel and/or rear wheel which was (previously) on the outer side of the curve.

The pressure surplus is automatically compensated by an active ABS control. The pressure deficit would principally be compensated by the active ABS control as well, however, only after a relatively long time period. Pressure increase rows until termination of the activity of a hydraulic inlet valve in a control channel typically have a duration of 700 to 800 msecs or even reach one second. It is obvious that the brake effect is limited during these periods, on the one hand. On the other hand, should there occur a change in curve (lane change), i.e., change in the direction of the curve, the front wheel and/or rear wheel which previously was at the inner side of the curve becomes the wheel at the outer side of the curve and shall now contribute to driving stability, steerability and deceleration. Both functions can only be fulfilled by the wheel on the outer side of the curve if it is sufficiently furnished with brake pressure. According to the present invention, this objective is achieved by the special pressure increase mode, i.e., by compressing the pressure increase pulses, as has been described hereinabove. This achieves a more rapid compensation of the prevailing pressure deficit and optimum driving stability.

A major variation of the curve radius may lead to a comparable situation.

If leaving of the previous curve track was detected in an already activated standard pressure increase row, this action will be accounted for—starting from the time of detecting the special situation—by transition to the special pressure increase mode and, consequently, to the compressed pressure increase pulse row. The start of the compressed pressure increase pulse row is set in this case, for example, to the half of the already activated pulse row.

What is claimed is:

1. A method of improving the control behavior of an anti-lock system of a four-wheel, two-axle vehicle, comprising the steps of:

measuring individual wheel speeds;

deriving a vehicle reference speed from the rotating behavior of the vehicle wheels;

obtaining criteria for identifying a cornering situation and the curve direction;

once a cornering situation is identified, replacing a standard control mode by a special control mode which already in a partial deceleration range causes a reduction in braking pressure on at least one curve-inner wheel; and when, during a braking operation and with the special control mode activated, the direction of the curve changes, compensating the reduced brake pressure by applying a special pressure increase mode.

2. A method as claimed in claim 1, wherein a pressure variation in control operations in the wheel brakes occurs by pulsewise actuation of electrically operable hydraulic valves which are inserted into pressure fluid conduits, wherein a pressure increase pulse row which is predetermined in the standard control mode is compressed in the special control mode by shortening pulse-pause times.

* * * * *